Aug. 6, 1940.　　　　E. L. ROSE　　　2,210,129
POWER TRANSMISSION
Filed Dec. 15, 1936　　2 Sheets-Sheet 1

INVENTOR
EDWIN L. ROSE
BY
ATTORNEY

Aug. 6, 1940.　　　　　E. L. ROSE　　　　　2,210,129

POWER TRANSMISSION

Filed Dec. 15, 1936　　　2 Sheets-Sheet 2

INVENTOR
*Edwin L. Rose*
BY
*Ralph L. Tweedale*
ATTORNEY

Patented Aug. 6, 1940

2,210,129

UNITED STATES PATENT OFFICE 2,210,129

POWER TRANSMISSION

Edwin L. Rose, Watertown, Conn., assignor to The Waterbury Tool Company, Waterbury, Conn., a corporation of Connecticut Application December 15, 1936, Serial No. 115,991

17 Claims. (Cl. 60—53)

This invention relates to power transmissions, particularly to those of the type comprising two or more fluid pressure energy translating devices one of which may function as a pump and another as a fluid motor. The invention is particularly concerned with systems utilizing a plurality of fluid motors connected to a common source of pressure fluid at constant pressure wherein each of the fluid motors may be independently controlled and regulated as to speed regardless of variations in the torque load applied to the motor.

There are many examples of power transmission installations in which a large number of independent machine units or sections of a machine are driven from a common source of power, as for example in a factory. It is necessary that each unit be capable of control as to speed independently of all the other units. In many instances, it is desirable to provide some means for varying the speed of the machine unit smoothly over a considerable range.

Hydraulic power transmission devices afford a ready means of providing smoothly variable speeds; that is without steps, but heretofore have required a complete individual pump and motor transmission unit for each machine unit being driven. It is well known that if a plurality of fluid motors be connected in parallel to a common pump that the fluid, following the path of least resistance, will operate only that motor which has the least resisting load so that it is impossible to insure driving two or more motors at different speeds or loads. Likewise, if the motors be connected in series to a common pump, equally great practical difficulties are encountered since it is necessary to operate the common pump against a pressure head equal to the sum of the pressures across each motor, and if any considerable number of motors are used, the pump pressure becomes excessive or if this is to be avoided, the size of the motor required is too great.

It is an object of the present invention to provide a multiple unit hydraulic power transmission system wherein a common pump or other source supplies fluid at constant pressure to a plurality of fluid motors, each of which may be automatically regulated to drive a load device at any desired speed against varying load torques, and to provide a novel fluid motor and control mechanism suitable for such a system.

Further objects and advantages of the present invention will be apparent from the following description, reference being had to the accompanying drawings wherein a preferred form of the present invention is clearly shown.

Figures 1, 4:
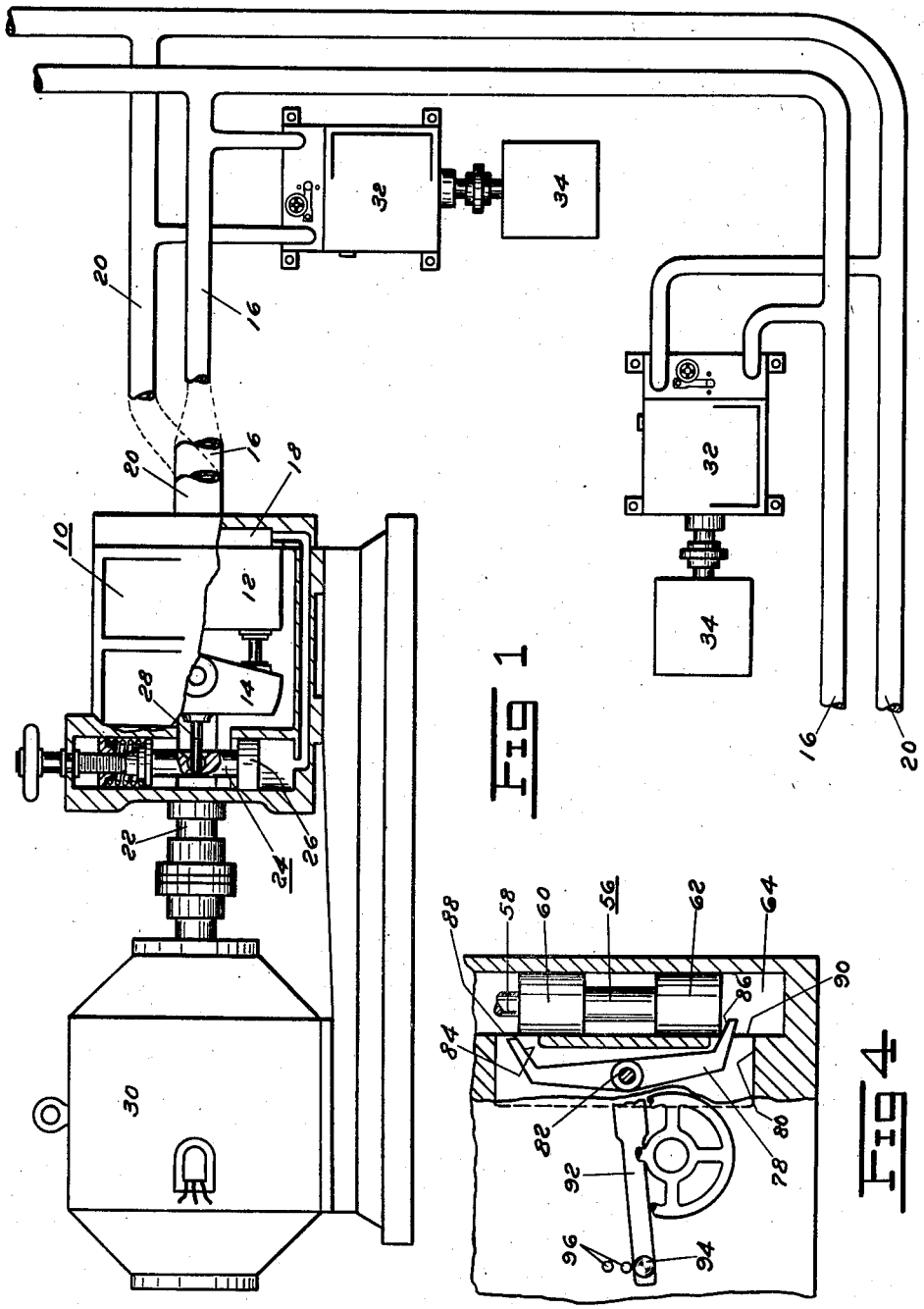
Fig. 1 is a diagrammatic view of a power transmission system incorporating a preferred form of the present invention.
Fig. 4 is a fragmentary cross section on line 4—4 of Fig. 3.

Referring now to Fig. 1 there is illustrated a source of fluid pressure comprising a variable displacement pump 10 which may be of any suitable construction and is shown as of the well-known "Waterbury" type comprising a revolving cylinder barrel 12 having parallel cylinder bores within which pistons are reciprocated by means of a tilting box and socket ring assembly 14. Fluid is drawn into the cylinder bores from a return conduit 16 through an arcuate valve port and is delivered to an arcuate valve port 18 and pressure conduit 20. The quantity of fluid delivered is determined by the inclination of the tilting box 14 relative to the main shaft 22, the position of the tilting box being controlled by a constant pressure regulating mechanism 24 comprising a spring-loaded piston 26 which is connected to a tilting box operating stud 28 and operates to increase the displacement of the pump upon a decrease in pressure in the line 20 and to decrease the displacement of the pump upon an increase in pressure in the line 20.

The shaft 22 may be driven from a suitable prime mover, such as an electric motor 30. The conduits 16 and 20 are connected to a plurality of fluid motors 32 so that the motors are in parallel with the pump 10. Each of the motors drives an independent load device indicated diagrammatically at 34.

Figure 2:
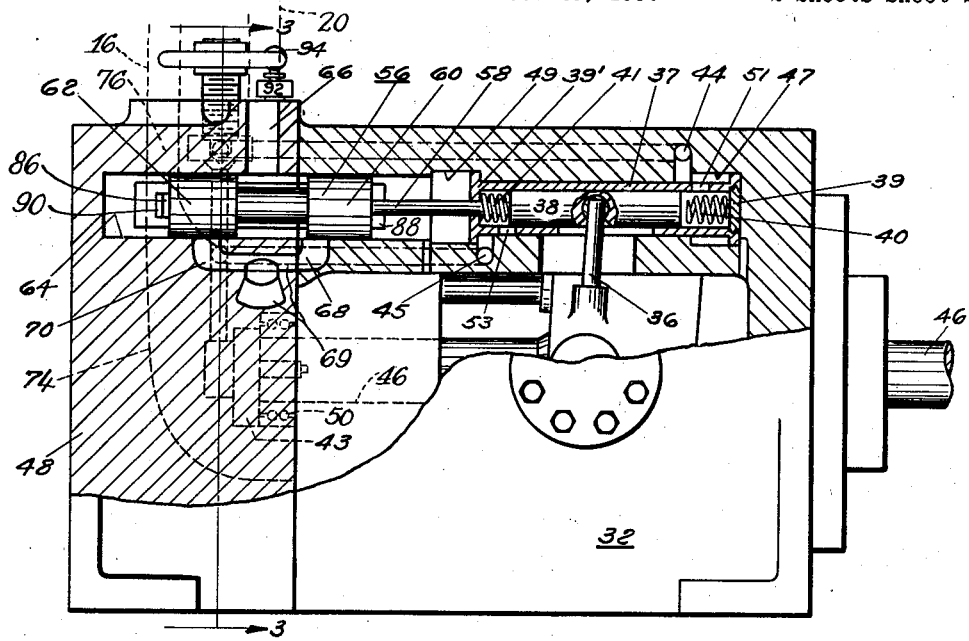
Fig. 2 is a side view partly in section of a fluid motor and control mechanism forming one of the elements of the system of Fig. 1.
Figure 3:
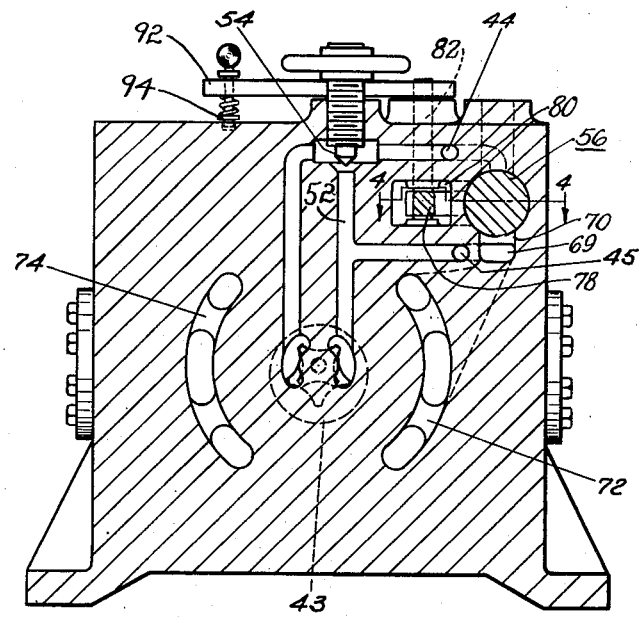
Fig. 3 is a cross section on line 3—3 of Fig. 2.

The construction of the motors and the control mechanism incorporated in each is illustrated in Figs. 2 through 4. The revolving parts of the motor 32 may be similar to those of the pump 10, the tilting box operating stud 36 extending vertically from the top thereof for controlling the displacement of the motor 32. The stud 36 is operated by a piston 38 slidably mounted in a sleeve 37 having end flanges 39 and 39'. Springs 40 and 41 are mounted in the sleeve 37 so that when the sleeve is moved to the right, as shown, the spring 41 engages the left end of piston 38 and spring 40 is free. When the sleeve 37 is moved to the left, the spring 40 engages the right end of piston 38 and spring 41 is free. A pump 43, of any suitable fixed displacement type, delivers fluid under pressure through either a conduit 44 or a conduit 45, depending on the direction of rotation, and withdraws fluid from the other conduit. A shaft 46 of the motor projects into a valve plate casting 48 beyond the shaft bearings 50 to connect to the pump 43 whereby the pump is driven at the same speed and in the same direction that the motor 32 operates.

The conduits 44 and 45 connect with cylinders 47 and 49 behind the flanges 39 and 39', from which communication may be established to the interior of sleeve 37 through openings 51 and 53. A by-pass conduit 52 connects the conduits 44 and 45 and is controlled by a manually adjustable throttle valve 54. By adjustment of the valve 54 the pressure developed by pump 43 at any speed may be varied. The pump 43, valve 54, piston 38 and springs 40 and 41 constitute a speed governing system whereby the stroke of the motor 32 may be regulated to maintain a substantially constant speed of the motor shaft.

For the purpose of concurrently controlling the volume of fluid supplied to the motor 32, a piston valve 56 is connected by a stem 58 to the piston 38. The valve 56 has two piston heads 60 and 62 slidable in a bore 64. An inlet port 66 enters the bore 64 at a point intermediate the heads 60 and 62 and is connected to the high pressure conduit 20. A pair of delivery ports 68 and 70 enter the bore 64 adjacent the heads 60 and 62 and are connected by a passage 69 to communicate with a valve port 72. The ports 68 and 70 are so spaced that only one port can be uncovered at a time and are arranged so that the opening is proportional to the displacement of the valve 56. The opposite valve port 74 communicates by a passage 76 with the return conduit 16.

In order to limit the range of movement of piston 38 and valve 56 to either one side or the other side of mid-position and also to lock these members in mid-position, means is provided comprising a cam bar 78 (Fig. 4) which is mounted in a cavity 80. The cam bar 78 is rigidly secured to a shaft 82 mounted in the valve plate 48 and projecting from the top thereof. The cam bar 78 is provided with two oppositely facing cam surfaces 84 and 86 which may be projected through openings 88 and 90 into the bore 64 to engage the piston heads 60 and 62. In the position shown in the drawings the cam face 86 limits the movement of piston 38 to the left in Fig. 2 to a minimum displacement position just short of mid-position. When the cam bar 78 is rotated clockwise in Fig. 4 through one half its range the piston heads 60 and 62 are held between the cam surfaces 84 and 86 and the piston 38 is retained in mid-position. When the cam bar is moved the full extent of its clockwise movement, the piston 38 is limited in movement to a minimum displacement position just short of mid-position but on the left-hand side thereof as seen in Fig. 2. The position of the cam bar 78 is controlled by a hand lever 92 rigidly secured to the shaft 82 and having a spring-pressed detent 94 engageable in holes 96 for positive retention of the lever 92 in any of the three positions described.

In operation the prime mover 30 is started causing the pump 10 to deliver fluid to conduit 20. The quantity of fluid delivered is automatically varied to maintain a constant pressure in the conduit 20 by the pressure regulating mechanism 24. If it is desired to start one of the load devices 34, the lever 92 may be moved to one side or the other of mid-position and the throttle valve 54 partially closed. The cam bar 78 will hold the piston 38 and valve 56 in a position slightly off mid-position, as shown in the drawings. Fluid is thus permitted to pass through valve 56 from line 20 to valve port 72 and the motor 32 is caused to revolve driving its connected load device 34. The pump 43 being thus operated with motor 32, pressure will be developed in conduit 44, for example, causing the sleeve 37 to move to the right into the position illustrated in the drawings. The spring 41 is thus rendered effective to urge piston 38 to the right against the fluid pressure developed by pump 43 and delivered through opening 51. For a given setting of the throttle valve 54 the piston 38 and valve 56 will take up a position which is determined by the resisting torque load. Thus assuming the load to be heavy the motor will tend to slow down, or if starting will fail to come up to speed, so that the pressure developed in conduit 44 is low. Spring 41 is thus able to move piston 38 to the right, increasing the displacement of motor 32 and increasing the volume of fluid supplied thereto. The motor is then able to handle the greater load because, by its greater displacement, the "leverage" of the fluid on the shaft is increased. The speed is not decreased, however, because the valve 56 was opened by an amount corresponding to the increased displacement so that a greater volume of fluid is supplied to the motor, which volume is sufficient to make up for the increased volume requirements. Upon a decrease in load on the shaft 46, the opposite action takes place.

The motor thus tends to operate at a constant speed regardless of variations in load torque. The speed may be adjusted by varying the opening at throttle valve 54. Thus, if the valve is further closed, the same pressure will be built up in conduit 44 or 45 at a lower speed than before and if opened the pressure will not be built up sufficiently until a higher speed is reached. It will be understood, of course, that the speed of the motor is not maintained absolutely constant for all loads. Due to the slight variation in pressure exerted by the spring 40 or 41 under different amounts of compression, the fluid pressure in the outlet of pump 43 which is required to balance the spring force at different positions of piston 38, varies correspondingly. This variation may be made as small as desired by proper selection of the springs 41 for force-deflection characteristics so that the variation in speed between light load and full load operation may be made as small a percentage of the average speed as may be desired.

The motor may be reversed by first opening the valve 54 fully to bring the motor to a stop or to a slow speed, and then shifting lever 92 to the opposite extreme position. The same action then takes place as that described above except the motor shaft turns in the opposite direction, the piston 38 and sleeve 37 operate on the left-hand side of mid-position and pressure is built up in conduit 45.

While the form of embodiment of the invention as herein disclosed, constitutes a preferred form, it is to be understood that other forms might be adopted, all coming within the scope of the claims which follow.

What is claimed is as follows:

1. In a power transmission system the combination with a source of fluid under predetermined pressure a plurality of variable displacement fluid motors connected in parallel with the source, an independent, variable torque load device connected to each fluid motor, and means associated with each motor for controlling the displacement thereof and for controlling the quantity of fluid supplied thereto in a manner to maintain the motor speed substantially constant under varying load torque, said means comprising a throttle valve and a displacement regulator, and means for operating the valve and displacement regulator simultaneously to increase the displacement and to open the valve in response to a slight decrease in motor speed.

2. In a power transmission system the combination with a source of fluid under predetermined pressure a plurality of variable displacement fluid motors connected in parallel with the source, an independent, variable torque load device connected to each fluid motor, and means associated with each motor for controlling the displacement thereof and for controlling the quantity of fluid supplied thereto in a manner to maintain the motor speed substantially constant under varying load torque, said means comprising a throttle valve and a displacement regulator, means for operating the valve and displacement regulator simultaneously to increase the displacement and to open the valve in response to a slight decrease in motor speed, and adjusting means for varying the constant speed at which the motor is controlled by the first means.

3. In a power transmission system the combination with a source of fluid under predetermined pressure a plurality of variable displacement fluid motors connected in parallel with the source, an independent, variable torque load device connected to each fluid motor, and means associated with each motor for controlling the displacement thereof and for controlling the quantity of fluid supplied thereto in a manner to maintain the motor speed substantially constant under varying load torque, said means comprising a throttle valve and a displacement regulator, and means including a fixed displacement auxiliary pump driven by the motor and a fluid motor responsive to the delivery pressure of said auxiliary pump for operating the valve and displacement regulator to increase the displacement and to open the valve in response to a slight decrease in motor speed.

4. In a power transmission system the combination with a source of fluid under predetermined pressure a plurality of variable displacement fluid motors connected in parallel with the source, an independent, variable torque load device connected to each fluid motor, means associated with each motor for controlling the displacement thereof and for controlling the quantity of fluid supplied thereto in a manner to maintain the motor speed substantially constant under varying load torque, said means comprising a throttle valve and a displacement regulator, means including a fixed displacement auxiliary pump driven by the motor and a fluid motor responsive to the delivery pressure of said auxiliary pump for operating the valve and displacement regulator to increase the displacement and to open the valve in response to a slight decrease in motor speed, and adjusting means including a by-pass valve connected to the outlet of the auxiliary pump for varying the constant speed at which the motor is controlled by the first means.

5. A fluid motor and control mechanism adapted to drive a variable torque load at substantially constant speed when connected with a source of fluid at constant pressure comprising in combination a variable displacement fluid motor, and means for controlling the motor displacement and the quantity of fluid supplied to the motor, said means comprising a throttle valve and a displacement regulator, and means for operating the valve and displacement regulator simultaneously to increase the displacement and to open the valve in response to a slight decrease in motor speed.

6. A fluid motor and control mechanism adapted to drive a variable torque load at substantially constant speed when connected with a source of fluid at constant pressure comprising in combination a variable displacement fluid motor, means for controlling the motor displacement and the quantity of fluid supplied to the motor, said means comprising a throttle valve and a displacement regulator, means for operating the valve and displacement regulator simultaneously to increase the displacement and to open the valve in response to a slight decrease in motor speed, and adjusting means for varying the constant speed at which the motor is controlled.

7. A fluid motor and control mechanism adapted to drive a variable torque load at substantially constant speed when connected with a source of fluid at constant pressure comprising in combination a variable displacement fluid motor, means for controlling the motor displacement and the quantity of fluid supplied to the motor, said means comprising a throttle valve and a displacement regulator, and means including a fixed displacement auxiliary pump driven by the motor and a fluid motor responsive to the delivery pressure of said auxiliary pump for operating the valve and displacement regulator to increase the displacement and to open the valve in response to a slight decrease in motor speed.

8. A fluid motor and control mechanism adapted to drive a variable torque load at substantially constant speed when connected with a source of fluid at constant pressure comprising in combination a variable displacement fluid motor, means for controlling the motor displacement and the quantity of fluid supplied to the motor, said means comprising a throttle valve and a displacement regulator, means including a fixed displacement auxiliary pump driven by the motor and a fluid motor responsive to the delivery pressure of said auxiliary pump for operating the valve and displacement regulator to increase the displacement and to open the valve in response to a slight decrease in motor speed, and adjusting means including a by-pass valve connected to the outlet of the auxiliary pump for varying the constant speed at which the motor is controlled.

9. In a power transmission system the combination with a source of fluid under predetermined pressure a plurality of variable displacement fluid motors connected in parallel with the source, an independent, variable torque load device connected to each fluid motor, means associated with each motor for controlling the displacement thereof and for controlling the quantity of fluid supplied thereto in a manner to maintain the motor speed substantially constant under varying load torque, said means comprising a throttle valve and a displacement regulator, and means for operating the valve and displacement regulator simultaneously to increase the displacement and to open the valve in response to a slight decrease in motor speed, and means for reversing the direction of rotation of the motor while maintaining the same connection to said source.

10. In a power transmission system the combination with a source of fluid under predetermined pressure a plurality of variable displacement fluid motors connected in parallel with the source, an independent, variable torque load device connected to each fluid motor, and means associated with each motor for controlling the displacement thereof and for controlling the quantity of fluid supplied thereto in a manner to maintain the motor speed substantially constant under varying load torque, said means comprising a throttle valve and a displacement regulator, means for operating the valve and displacement regulator to increase the displacement and to open the valve in response to a slight decrease in motor speed, and means normally preventing movement of the displacement controlling means into zero displacement position.

11. A fluid motor and control mechanism adapted to drive a variable torque load at substantially constant speed when connected with a source of fluid at constant pressure comprising in combination a variable displacement fluid motor, means for controlling the motor displacement and the quantity of fluid supplied to the motor, said means comprising a throttle valve and a displacement regulator, and means for operating the valve and displacement regulator to increase the displacement and to open the valve in response to a slight decrease in motor speed, and means normally preventing movement of the displacement controlling means into zero displacement position.

12. In a power transmission system the combination with a source of fluid under predetermined pressure a plurality of variable displacement fluid motors connected in parallel with the source, an independent, variable torque load device connected to each fluid motor, means associated with each motor for controlling the displacement thereof and for controlling the quantity of fluid supplied thereto in a manner to maintain the motor speed substantially constant under varying load torque, said means comprising a throttle valve and a displacement regulator, and means for operating the valve and displacement regulator to increase the displacement and to open the valve in response to a slight decrease in motor speed, and means normally preventing movement of the displacement controlling means into zero displacement position and operable selectively to limit the range of movement of the displacement controlling means to one or the other side of zero displacement position.

13. A fluid motor and control mechanism adapted to drive a variable torque load at substantially constant speed when connected with a source of fluid at constant pressure comprising in combination a variable displacement fluid motor, means for controlling the motor displacement and the quantity of fluid supplied to the motor, said means comprising a throttle valve and a displacement regulator, and means for operating the valve and displacement regulator to increase the displacement and to open the valve in response to a slight decrease in motor speed, and means normally preventing movement of the displacement controlling means into zero displacement position and operable selectively to limit the range of movement of the displacement controlling means to one or the other side of zero displacement position.

14. In a power transmission system the combination with a source of fluid under predetermined pressure a plurality of variable displacement fluid motors connected in parallel with the source, an independent, variable torque load device connected to each fluid motor, means associated with each motor for controlling the displacement thereof and for controlling the quantity of fluid supplied thereto in a manner to maintain the motor speed substantially constant under varying load torque, said means comprising a throttle valve and a displacement regulator, and means for operating the valve and displacement regulator to increase the displacement and to open the valve in response to a slight decrease in motor speed, and means normally preventing movement of the displacement controlling means into zero displacement position and selectively operable to hold the displacement controlling means in zero displacement position for stopping the motor.

15. A fluid motor and control mechanism adapted to drive a variable torque load at substantially constant speed when connected with a source of fluid at constant pressure comprising in combination a variable displacement fluid motor, means for controlling the motor displacement and the quantity of fluid supplied to the motor, said means comprising a throttle valve and a displacement regulator, and means for operating the valve and displacement regulator to increase the displacement and to open the valve in response to a slight decrease in motor speed, and means normally preventing movement of the displacement controlling means into zero displacement position, and selectively operable to hold the displacement controlling means in zero displacement position for stopping the motor.

16. In a power transmission system the combination with a source of fluid under predetermined pressure a plurality of variable displacement fluid motors connected in parallel with the source, an independent, variable torque load device connected to each fluid motor, means associated with each motor for controlling the displacement thereof, means for controlling the quantity of fluid supplied thereto in a manner to maintain the motor speed substantially constant under varying load torque, said last two means being simultaneously operable, and means for reversing the direction of rotation of the motor while maintaining the same connection to said source.

17. A fluid motor and control mechanism adapted to drive a variable torque load at substantially constant speed when connected with a source of fluid at constant pressure comprising in combination a variable displacement fluid motor, means for controlling the motor displacement, means for controlling the quantity of fluid supplied to the motor, said last two means being simultaneously operable and means normally preventing movement of the displacement controlling means into zero displacement position.

EDWIN L. ROSE.